United States Patent

[11] 3,591,922

[72] Inventors Munson H. Pardee
Clinton;
Richard D. Turi, Utica; Richard L. Butler, Richfield Springs; Edward C. Zacaroli, Utica, all of, N.Y.

[21] Appl. No. 781,455
[22] Filed Dec. 5, 1968
[45] Patented July 13, 1971
[73] Assignee Sperry Rand Corporation
New York, N.Y.

[54] FABRICATION OF ELECTRICAL SOLDER JOINTS USING ELECTRODEPOSITED SOLDER
4 Claims, 10 Drawing Figs.

[52] U.S. Cl. 29/626, 29/628, 29/502, 174/68.5, 317/101, 339/17
[51] Int. Cl. H05k 3/30
[50] Field of Search 174/68.5; 29/624—629, 502; 317/101; 339/17

[56] References Cited

UNITED STATES PATENTS

| | | | |
|---|---|---|---|
| 2,932,772 | 4/1960 | Bowman et al. | 317/101 |
| 3,143,787 | 8/1964 | Bubbe | 29/625 |
| 3,184,830 | 5/1965 | Lane et al. | 29/624 |
| 3,196,522 | 7/1965 | Bernstein | 29/624 |
| 3,214,827 | 11/1965 | Phohofsky | 29/502 X |
| 3,350,250 | 10/1967 | Sang et al. | 29/429 |
| 3,429,037 | 2/1969 | Dugan et al. | 29/626 X |
| 3,509,268 | 4/1970 | Schwartz et al. | 174/68.5 |
| 3,022,480 | 2/1962 | Tiffany | 174/68.5 |

*Primary Examiner*—John F. Campbell
*Assistant Examiner*—Robert W. Church
*Attorneys*—Charles C. English, William E. Cleaver and Rene A. Kuypers ABSTRACT: The present device provides a common-connection element such as a bus bar whereupon solder has been electrodeposited and which has been formed to fit over backboard wiring prongs in such a fashion as to come in contact with certain of said prongs. The combination of the bus bar and the backboard wiring prongs is then heated to a point that the solder melts and the prongs become sufficiently hot to draw the solder, or cause a capillary action between the melted solder on the common-connection element and the prongs, thereby causing the solder to build fillets around each of the respective prongs coming in contact with the common-connection element.

PATENTED JUL 13 1971 3,591,922

INVENTORS
MUNSON H. PARDEE
RICHARD L. BUTLER
RICHARD D. TURI
EDWARD C. ZACAROLI

BY William E. Gleason
ATTORNEY

INVENTORS
MUNSON H. PARDEE
RICHARD L. BUTLER
RICHARD D. TURI
EDWARD C. ZACAROLI

BY William E. Glaser
ATTORNEY

FABRICATION OF ELECTRICAL SOLDER JOINTS USING ELECTRODEPOSITED SOLDER

BACKGROUND OF THE INVENTION

In many electronic devices, such as computers, it has become the practice to fabricate circuit cards so as to provide female circuit connections at the ends thereof. These circuit cards are joined with the male plugs of other circuits mounted on the frame of the machine, when such circuit cards are to become operative. It is with respect to the male plug arrangements mounted on the frame of the machine that this present invention is primarily described. With such a male plug arrangement there are usually found prongs or male plugs facing the position wherein the circuit cards is located or can be located. These prongs when joined with the female plugs complete the electrical circuit paths between the circuits of the circuit cards and other circuits mounted on the frame of the machine. The prongs are usually mounted in and through small plastic walls, or fiberglass bars, and extend from each side thereof. One such extensions is into the inner portions of the frame of the machine. The plastic walls give the prongs rigidity on the circuit card side, which we shall call the front side, and on the side facing the internal portion of the frame, which we shall call the back side.

It has been the practice to wire wrap the prongs which extend from the back side, or the rear side, of the plastic wall in order to provide further electrical connections therewith. The wire wrap lines are then wired to some other prongs at other locations to make suitable circuit paths therewith for the purpose of sending signals from a circuit card at one physical location on the frame of the machine to another circuit card at another location on the frame of the machine. A certain number of the prongs usually represents common voltage reference means such as ground potential, or some supply voltage. It has been the practice to physically connect each of the similar prongs, i.e., to provide a common reference voltage to every such similar prong. In the matter of placing all of these similar (in an electrical sense) prongs in contact with one another it has been the practice to drill holes in a common-connection medium, drop the common-connection medium over the predesignated prongs, thereafter deposit small donuts of solder over the prongs and heat the solder until it melts and comes in contact with the conducting medium thereby making connections between the respective prongs and the common-connection medium.

This practice for the most part has been satisfactory but is burdened with three undesirable aspects. It has been found that very often certain of the donuts of solder have a tendency to spatter when they are fully heated to their melting temperature and this has given rise to short circuits among the backboard wiring connections. In addition it has been found that if on occasion the donuts apparently do not get seated properly before they are melted, there is not a full or complete contact around the prongs with respect to the conducting medium. Finally, it is somewhat of a costly item to have the individual donuts threaded on the proper prongs and in addition in this area there has been some human error where the donuts have been threaded upon the wrong prongs. The present invention eliminates the necessity of threading donuts on the proper prongs and eliminates the spattering and improper seating possibilities which are inherent in the donut technique and which have led to the improprieties set forth above.

SUMMARY

The present device provides a means whereby the common voltage bus bars are individually patterned to fit over the proper, or predesignated, prongs on the backboard wiring arrangements. The patterns formed in these bus bars are such that they have a reasonably tight fit with the prongs over which they are being fitted. In addition these bus bars are electrodeposited with solder so that when they have been properly seated onto the predesignated prongs and the package is heated the solder will be drawn toward the prongs and provide complete connections between the prongs and the bus bars. This technique eliminates any spattering and eliminates any necessity to have donut-type solder elements selectively located on the prongs.

The features and the objects of this invention will be more fully understood from the following description when considered in connection with the accompanying drawings, in which.

Figure 1:
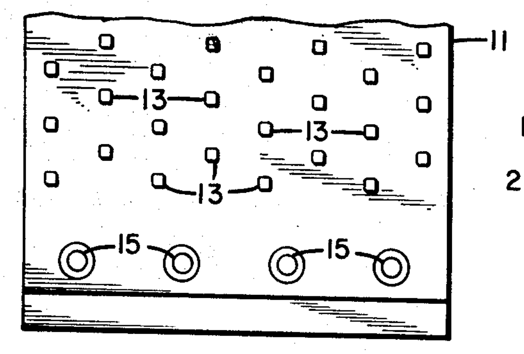
FIG. 1 is a view of the back of the prong board.
Figure 2:
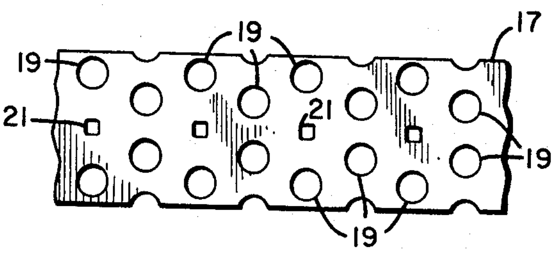
FIG. 2 is a view of a section of a bus bar.

In FIG. 1 there is shown a back view of the wall structure 11 with a sectional view of the prongs 13. Also shown in FIG. 1 are the locating studs 15. It should be understood that the wall structure can be any type of rigid plastic or fiberglass through which the prongs 13 pass. In other words, the prongs 13 are molded into the board 11. In FIG. 2 there is shown a section of a bus bar 17 having oversized holes 19 as well as fitted holes 21. In the preferred embodiment the bus bar is a copper base. The fitted holes 21 are formed to be only slightly larger than the cross section of the prongs 13.

The copper bus bar 17 has an electrodeposit of solder formed thereon. This is accomplished by placing an electrode of an alloy of tin and lead along with the bus bar as the cathode into a bath of 60 140 tin lead fluoborate and electrically connecting the bus bar to a source of power along with the alloy of tin and lead. In this way the tin-lead electrode acts as anode and the bus bar acts as a cathode. The tin-lead is electrodeposited on the bus bar in accordance with this technique to form a solder which is approximately 2.5—4.0 mils thick. The lead-tin alloy is made of 60 percent lead and 40 percent tin in the preferred embodiment but obviously other combination of tin and lead may be used.

Figure 3:
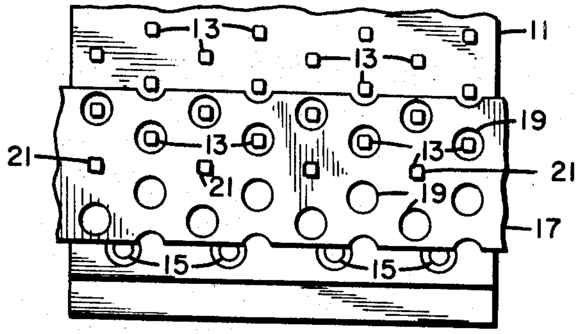
FIG. 3 is a back view showing the section of the bus bar of FIG. 2 overlaid on the structure of FIG. 1.

FIG. 3 depicted the arrangement with the bus bar and the electrodeposited solder therein overlaid on the backboard wiring board. It will be noted that the prongs 13 are in contact with the bus bar 17 at the four locations 21 while the prongs 13 are not in contact with the bus bar 17 at the oversized holes 19.

Figure 4:
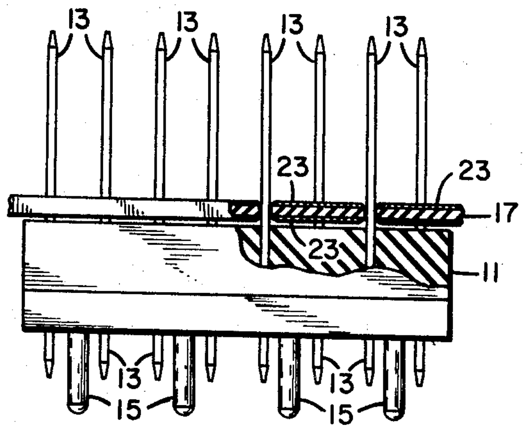
FIG. 4 is an end view of the prong board showing the prongs on the front side and the rear side and with the bus bar sectionalized.

FIG. 4 is a pictorial end view of the wall board 11 with the prongs 13 shown to be passing therethrough. Also shown clearly in FIG. 4 are the alignment studs 15. The alignment studs 15 enable the wallboard 11 to be aligned into the machine frame so that the prongs 13 on the front side come in contact with the circuit cards that are used therewith.

FIGS. 3 and 4 depict the wallboard with the electrodeposited bus bar located thereon and wherein the arrangements has not been subjected to heat. Although it is exaggerated in FIG. 4, for the purposes of the discussion, there is shown 5 mils of solder 23 which has been electrodeposited onto the bus bar. Now after the electrodeposited bus bar has been located onto the backboard 11 as shown in FIGS. 3 and 4 it is subjected to heat. It is usually heated to 370° F. if it is a 60:40 40 ratio of lead to tin, or to other temperatures depending upon the content of the lead. The prongs 13 are made of brass or copper. We have found that there is a time lag between the heating of the solder, on the bus bar, to its melting point and any damaging heat to the prongs. The heating is effected by induction heating in the preferred embodiment, although other forms of heating may be used.

The packages (i.e., the prong boards with the bus bars overlain thereon) are transported through a furnace or induction heating unit at a speed of 1.5 feet per minute so that they are held in the furnace or induction heating unit for about 40 to 50 seconds. The brass prongs are in contact with the bus bar and accordingly act as heat conductors. It is through this phenomenon that capillary action takes place and the solder is drawn toward the prong and actually becomes built up between the prong and the bus bar to form fillets around the base of the prong and in contact with the bus bar.

Figure 5:
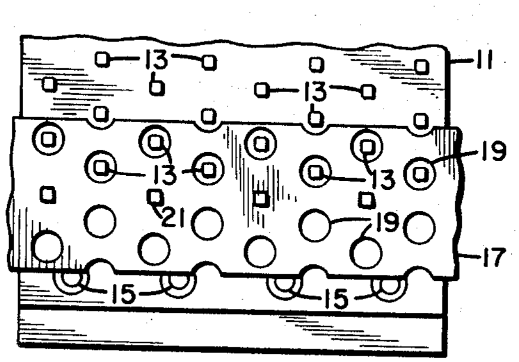
FIG. 5 is a back view as shown in FIG. 3 after the heat has been applied to the structure and the fillets have been formed between the prongs and the bus bar.

In FIG. 5 there is shown a rear view of the backboard with the bus bar overlain thereon and with the arrangement having been subjected to heat according to the foregoing description. In this case it will be noted that there is no separation depicted between the prong and the bus bar, this being now built up into metal material by virtue of the fillets around the base of the prong.

Figure 6:
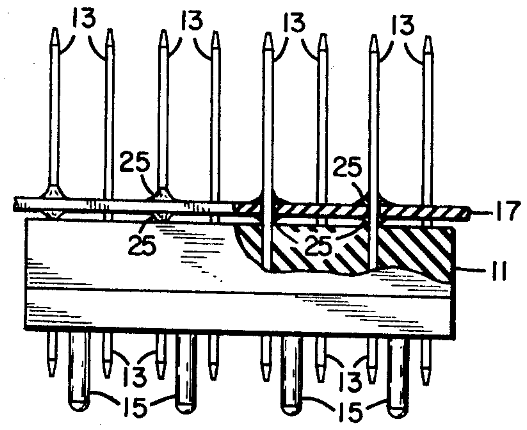
FIG. 6 is an end view of the prong board showing the arrangement of FIG. 5 with the fillets built up between the bus bar and the prongs.

FIG. 6 more dramatically shows the fillets 25 having been built up around the base of the prongs 13. Now if we assume that all the prongs which are fitted with the particularly formed apertures 21, were prongs that were intended to be connected to a common voltage source, or common reference potential, such as ground, then when the device has been subjected to heat and the fillets built up, all of these prongs will be electrically connected to the bus bar as shown in FIG. 6. In accordance with this techniques we have found no spattering of the solder between the prongs which are to be soldered and other prongs. In addition there is no need to thread the donut-type solder rings on top of the prongs. It also should be noted from FIG. 5 that there is no connection between the prongs which pass through the oversize holes.

Figure 7:
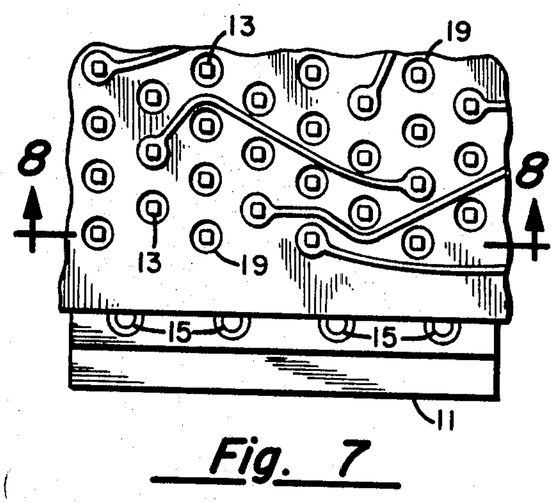
FIG. 7 shows a printed circuit as an overlay on the prong board of FIG. 1 wherein the printed circuits have been electrodeposited with solder.
Figure 8:
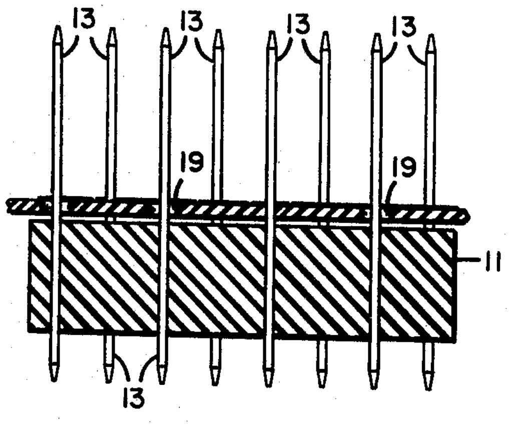
FIG. 8 shows an end section of the prong board being sectionalized through the appropriate line of FIG. 7.

FIG. 7 shows a view similar to the view shown in FIGS. 3 and 5, excepting that FIG. 7 instead of having a bus bar there is shown a printed circuit arrangement. The printed circuit arrangement has the circuit paths with electrodeposited coating of solder thereon. It will also be noted that in the circuit paths of the printed circuit, the holes therein are rectangularly shaped holes which have a snug or a tight fit over the prongs. This last going concept is accomplished by properly selecting the artwork in preparing the printed circuits and is shown in FIG. 8.

Figure 9:
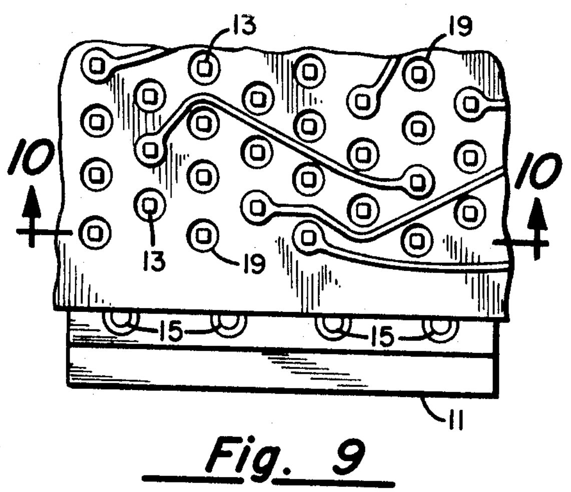
FIG. 9 shows a rear view of the prong board as arranged in FIG. 7 after the heat has been applied to the structure and the fillets have been built up.

FIG. 9 shows the arrangement of FIG. 7 when the device has been subjected to sufficient heat to melt the solder and to create the capillary action between the prongs and the printed circuit path.

Figure 10:
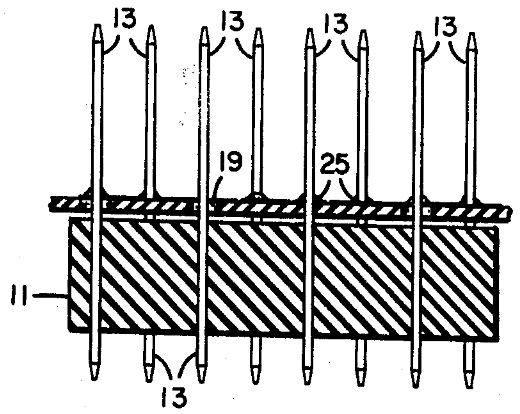
FIG. 10 shows an end view of the arrangement of FIG. 9 sectionalized along the appropriate line of FIG. 9.

FIG. 10 shows the arrangement in FIG. 9 with the fillets of metal built up between the base of the prong and the circuit paths.

The embodiments of the invention in which we claim an exclusive property or privilege is are defined as follows:

1. A method for interconnecting electrical terminals comprising the steps of:

a. securing a plurality of electrical terminals in an electrically nonconducting base member;
b. solder plating a common-connection member;
c. forming a plurality of first apertures in said common-connection member each of which first apertures has a cross section slightly larger than the cross section of an individual one of said elongated electrical terminals;
d. forming a plurality of second apertures in said common-connection member each of which second apertures has a cross section which is very much larger than the cross section of an individual one of said elongated electrical terminals;
e. placing said common-connection member over said elongated electrical terminals in order that it comes to rest in close proximity to said electrically nonconducting base with certain of said elongated electrical terminals passing through said first apertures and others of said elongated electrical terminals passing through said second apertures; and
f. passing said base member with said elongated electrical terminals secured therein and with said common-connection member located thereupon through a heating chamber so as to cause said solder layer on said common-connection member to be drawn up on said certain ones of said elongated electrical terminals which pass through said first apertures thereby making an electrical connection between said last-mentioned elongated electrical terminals and said common-connection member.

2. A method for interconnecting electrical terminals according to claim 1, wherein the step of passing said base member to a heating chamber includes the step of subjecting said base member with said elongated electrical terminals secured therein and with said common connection located thereupon to induction heating.

3. A method of interconnecting electrical terminals according to claim 1 wherein the steps of solder plating a common-connection member includes the step of placing a copper base means into a bath of 60 140 tin/lead fluoborate and further includes a step of connecting to a source of electrical power said copper base as a cathode and an electrode made of tin and lead and placing said cathode and electrode into said last-mentioned bath.

4. A method for interconnecting electrical terminals in accordance with claim 1 wherein said step of passing said base member to a heating chamber includes the step subjected said base member to induction heating by transporting said member through an induction heating chamber at the rate of 1.5 feet per minute and wherein the temperature of said induction chamber is held at approximately 370° F.